United States Patent [19]

Petzinger

[11] 4,108,609
[45] Aug. 22, 1978

[54] COMPOST CONTAINER

[76] Inventor: Manfred Wilhelm August Petzinger, Rte. 7, Box 87, Elizabethtown, Ky. 42701

[21] Appl. No.: 821,849

[22] Filed: Aug. 4, 1977

[51] Int. Cl.² .............................................. C05F 9/02
[52] U.S. Cl. ................................ 23/259.1; 71/64 JC; 71/14; 220/1 T; 195/144
[58] Field of Search ...................... 23/259.1; 71/5–15, 71/64 VC; 220/1 T; 195/139–144

[56] References Cited

U.S. PATENT DOCUMENTS

| | | | |
|---|---|---|---|
| 1,919,836 | 7/1933 | Goldsborough | 195/142 X |
| 2,062,264 | 11/1936 | Goldsborough | 71/8 X |

Primary Examiner—James H. Tayman, Jr.
Attorney, Agent, or Firm—Thomas O. Maser

[57] ABSTRACT

A compost container including a base section for receiving fertilizer sap, and an upper compost containing section having multiple compartments for receiving decomposable garbage and waste mounted on the base section. A floor divides the upper section from the base section for retaining the decomposable garbage and waste in the upper section but permits the fertilizer sap to gravitate therethrough to the lower section. Access means are provided for adding the decomposable garbage or waste to the compartments, and for removing compost and fertilizer sap from the upper section and base section respectively.

7 Claims, 4 Drawing Figures

COMPOST CONTAINER

CROSS REFERENCE TO RELATED APPLICATION

This invention is related to co-pending U.S. application Ser. No. 821,684, filed Aug. 4, 1977, by the same inventor.

BACKGROUND OF THE INVENTION

Decomposable garbage and waste is conventionally converted into compost by means of a self-decaying hot fermenting process, the rapidly developing earthworm population being the major contributing factor in the decaying process. In the past, the making of compost has been carried out by simply arranging the decomposable garbage and waste in a pile on the ground and then moistening the same with water to aid the fermentation process. After the fermentation process is completed and the compost formed, it may be used as earth covering during the growing seasons and to fertilize and maintain lawns and gardens.

Since the fermentation process takes approximately three or four months, and the pile is usually in an exposed area, problems can result due to the unsightliness of the pile and the possibility that the compost pile will attract animals and rodents.

SUMMARY OF THE INVENTION

The present invention comprises a fully enclosed, stationery, compost container into which garbage and decomposable waste may be placed, which garbage and waste is hidden from view and from access by animals or rodents during the fermentation process. After the fermentation process is completed, compost and fertilizer sap formed within the enclosure may be removed, as desired, for use.

The compost container of the present invention includes an upper compost containing section into which the garbage and waste is placed, and a base section into which fertilizer sap gravitates from the fermenting garbage and waste, the two sections being divided by a floor, the component parts of which are slightly spaced apart to permit the fertilizer sap to pass therethrough.

The upper section preferably includes multiple compartments into which the garbage and waste may be selectively placed, both compartments being provided with removable cover means for adding the garbage and waste thereto periodically.

Both the base and upper section also include access means for facilitating the removal of compost from the upper section compartments and for removing the fertilizer sap from the base section.

DETAILED DESCRIPTION OF THE INVENTION

The compost container of the present invention includes a base section generally designated 10 on which is mounted an upper compost containing section 12.

Figure 1:
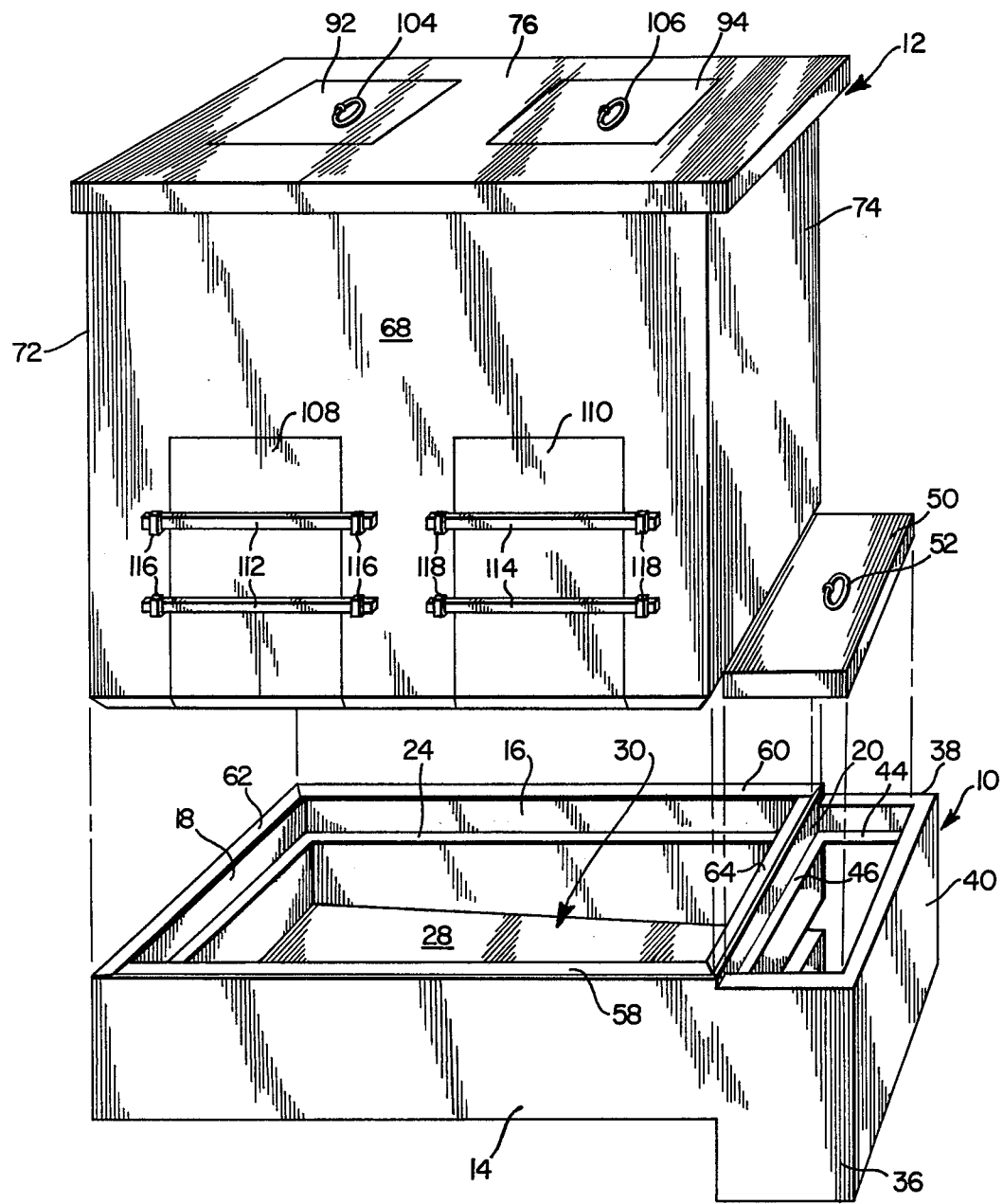
FIG. 1 is an exploded perspective view of the compost container of the present invention.
Figure 2:
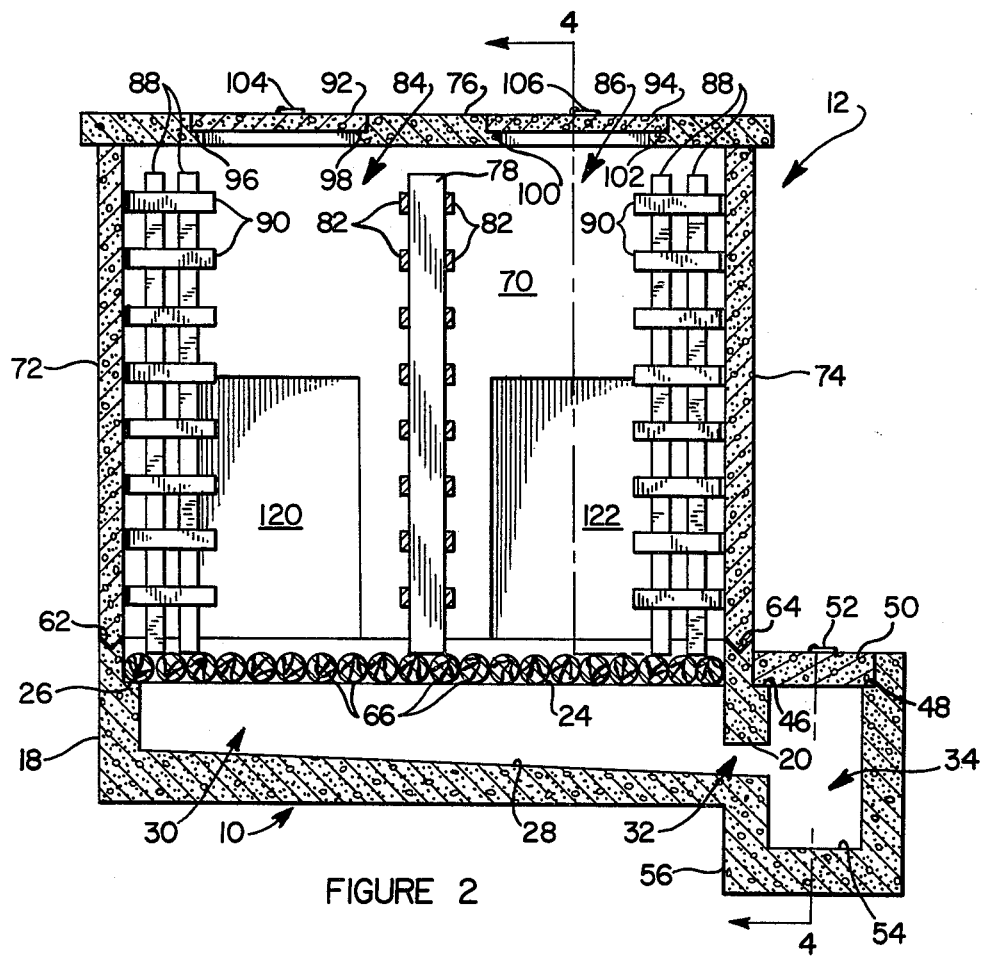
FIG. 2 is a longitudinal sectional view of the compost container of the present invention.

Base section 10 includes spaced side walls 14 and 16 and end walls 18 and 20 which walls are preferably made of concrete or brick and measure approximately 8 cms. in thickness. Portions of the side and end walls are thickened to provide side ledges 22 and 24 and an end ledge 26. As shown in FIGS. 1 and 2, base section 10 further includes a sloping bottom wall 28, thereby providing a fertilizer sap receiving housing 30 which directs the flow of fertilizer sap from end wall 18 to end wall 20.

It will be noted from a consideration of FIG. 2 that end wall 20 is spaced from bottom wall 28 to provide a passage 32 through which liquid sap flows into an adjoining and contiguous collecting tank 34 which includes side walls 36 and 38 and an end wall 40, which walls are substantially the same thickness as the walls of the remaining portion of the base section. Side walls 36, 38 and end wall 40 are provided with side ledges 42 and 44 and end ledges 46 and 48 which are adapted to support a cover 50 having a pull ring 52 which facilitates removal of the cover when it is desired to remove fertilizer sap from tank 34. The tank 34 further includes a bottom wall 54 and an end wall 56 which is in opposed, spaced relation to end wall 20 of the base section, thereby forming a passage 32 through which the fertilizer sap flows into holding tank 34.

The internal walls of base section 10 are preferably treated with a waterproofing material in order to prevent the fertilizer sap from penetrating the same.

It will be noted from the drawings that the upper edges of side walls 14 and 16 and end walls 18 and 20 are provided with recesses of V-shape cross-section, which are designated 58, 60, 62 and 64 respectively for purposes which will be hereinafter more fully set out.

In accordance with the present invention, logs 66 are arranged within the upper portion of base section 10, which logs extend transversely of the base section and the ends thereof are supported on side ledges 22 and 24. Logs 66 are preferably treated with a penetrating wood preservative to prolong the life thereof and are spaced approximately 1 cm. apart in order to permit the fertilizer sap to gravitate between the logs into the base section.

Upper compost container section 12 includes side walls 68 and 70, end walls 72 and 74 and a top wall 76, thereby forming a housing which is adapted to receive decomposable garbage and waste.

The lower edges of side walls 68 and 70 and end walls 72 and 74 are formed to complement the V-shaped annular recesses of the upper edge of base section 10 in order to facilitate assembly of the two sections.

Figure 4:
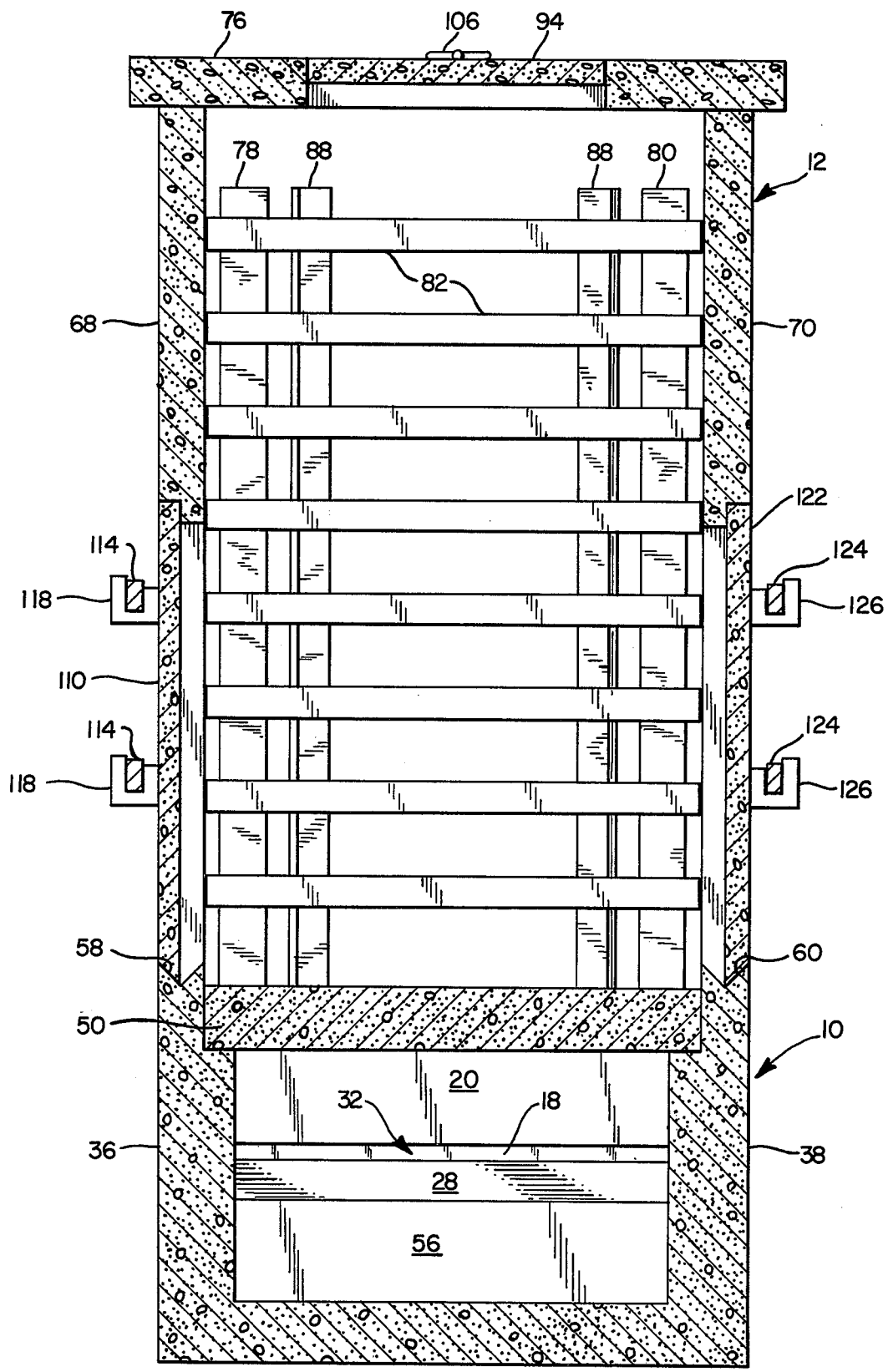
FIG. 4 is an enlarged sectional view taken along the line 4—4 of FIG. 2, looking in the direction of the arrows.

Internally of the upper section housing, there are provided a pair of spaced upstanding posts 78 and 80 located approximate side walls 68 and 70 at approximately the mid-point of the length of the housing, the upstanding post being supported by logs 66. As shown to advantage in FIGS. 2 and 4, 1 inch furring strips 82 extend between posts 78 and 80 in spaced, parallel relation, thereby dividing the housing into two compartments designated 84 and 86.

Figure 3:
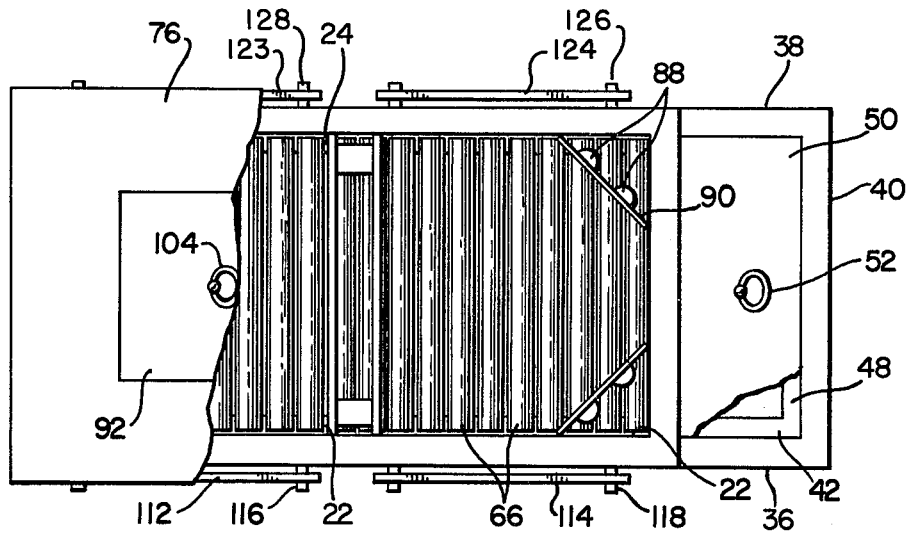
FIG. 3 is a top plan view of the compost container, a portion thereof being removed to disclose details of construction.

Each of the four corners of the housing is provided with a grill or lattice comprising vertical members 88 and horizontal members 90 which are secured together in spaced relationship, the horizontal members being approximately 10 cms. apart. As shown in FIG. 3, each grill extends between a side and end wall across the corner portion of the housing for preventing the accumulation of the garbage and waste in the corners and permitting circulation of air in the space thereby formed. The wooden component parts of the grill and dividing member in the housing are preferably treated with a penetrating wood preservative to prolong the life of these parts.

In order to permit individual access to compartments 84 and 88, top wall 76 of section 12 is provided with a pair of spaced, removable covers 92 and 94 which are supported by ledges 96, 98, 100 and 102 formed in top wall 78. Pull rings 104 and 106 facilitate removal of covers 92 and 94 to add garbage and waste to compartments 84 and 86.

Side walls 68 is provided with a pair of doors 108 and 110 located near the lower limit of upper section 12, which doors are retained by bars 112 and 114 respectively which span the door and engage keepers 116 and 118 which are mounted on wall 68. Doors 108 and 110 may be opened in an obvious manner by removing bars 112 and 114 to permit access to compartments 84 and 86.

In like manner, wall 70 is provided with doors 120 and 122 which are held in position by bars 123 and 124 which engage keepers 126 and 128 which are mounted on wall 70 adjacent to the doors.

The upper section 12 on the compost container is manufactured of concrete or brick construction approximately 8 cms. in thickness. The side doors and top covers are also preferably made of concrete but may optionally be made of wood or other material. The interior walls of the container are preferably painted black with a tar base paint to seal the walls and top cover.

When erecting the present compost container, base section 10 is preferably sunk in the ground with the upper limit thereof at approximately ground level.

In use of the compost container of this invention, only one of compartments 84 and 86 should be filled at one time and decomposable garbage and waste should, if at all possible, be deposited in the compartment when it is still fresh. In order to add the waste, top cover 92 and 94 is removed to permit the waste to be added to compartment 84 and 86. The moisture content of the waste should be the same throughout the compost container and peat soil may be added if the moisture is excessive. Dry waste should be moistened down with water or sap from the compost container. After the garbage and waste are added to the compartment, the top cover is replaced and the conversion of the same into compost takes place by means of a self-decaying hot fermenting process. The rapidly developing earthworm population is the major contributing factor in this process. The decomposing process is considered complete when the contents inside the compartment is a dark, soil color, and appears rotten.

It is recommended that the compost be removed when the completely decayed layer reaches the top of one of the side door openings. When it is desired to remove the compost, selected door or doors 108, 110, 120 and 122 are opened by removing the appropriate bars holding the doors in position.

For the most efficient use of the container of the present invention, waste and garbage must be continuously added at all times to the compartments. The compost container can be placed in a location near the home, since odor and vermin do not exist outside of the compost container. The side doors and top covers of the container remain closed at all times except when adding garbage and waste thereto or removing the compost therefrom.

During the fermenting process, fertilizer sap formed thereby gravitates between logs 66 into housing 30 of base section 10 where it is directed by sloping bottom wall 28 through passageway 32 into collecting tank 34 which is located laterally adjacent upper section 12.

In order to remove the fertilizer sap for use on a garden or lawn, it is only necessary that cover 50 be removed. A container or other suitable article may then be placed in the tank and filled for use on the garden or lawn.

The compost container of the present invention provides a simple, but effective, permanent structure which may be economically built for making compost and mould from decomposable garbage and waste, while at the same time producing earthworms as a by-product. By virtue of the closed nature of the container, such a structure hides the decomposable garbage and waste from view, does not attract animals and rodents, and does not produce an offensive odor which would occur if the garbage and waste were placed in the ground or in an open container.

While there has been herein shown and described the presently preferred form of this invention, it is to be understood that such has been done for purposes of illustration only and that various changes may be made therein within the scope of the appended claims.

What is claimed is:

1. A compost container including:
   a. a base section, including side, end and bottom walls, providing a first housing to receive fertilizer sap, collecting means for receiving the fertilizer sap, and access means in said collecting means for permitting selective removal of the fertilizer sap therefrom,
   b. an upper section mounted on said base section providing a second housing to receive decomposable garbage and waste, said upper section including side, end and first top walls providing said second housing, and grill means placed across the corners of the second housing between the side and end walls thereof to prevent the accumulation of garbage and waste in the corners of the second housing and to permit circulation of air in the second housing,
   c. a floor between said base and upper section for supporting the decomposable garbage and waste,
   d. said floor having means for permitting fertilizer sap to gravitate from the upper section to the base section, and
   e. access means in said upper section to permit decomposable garbage and waste to be added to, and removed from, the second housing.

2. The compost container of claim 1, wherein:
   a. said bottom wall of said base section is sloped in a direction to direct the fertilizer sap to a lowest portion of the base section, and
   c. said collecting means is contiguous with and communicates with said lowest portion and extends beyond an end wall of the upper section, the collecting means further including a second top wall covering that portion extending beyond the end wall and an access means in said second top wall.

3. The compost container of claim 1, wherein said upper section includes barrier means extending between said side walls at approximately the mid-point thereof to provide two compartments for the selective reception of decomposable garbage.

4. The compost container of claim 3, wherein:
   a. said access means comprises removable covers in the top wall of said upper section overlying each of the compartments whereby decomposable garbage may be added thereto.

5. The compost container of claim 1, wherein:
   a. said access means comprises doors to each of the compartments located proximate the lower end of said upper section, and
   b. means for normally retaining said doors in closed position.

6. A compost container including:
   a. a base section having side, end and bottom walls forming a housing to receive fertilizer sap,
   b. an upper section mounted on said base section having side, end and first top walls forming a housing to receive decomposable garbage and waste,
   c. a floor comprising a plurality of spaced members between said base and upper sections for supporting the decomposable garbage and permitting fertilizer sap to gravitate from the upper section to the base section,
   d. the bottom wall of said base section being sloped to direct the fertilizer sap to a lowest portion of the base section,
   e. a collecting tank for receiving the fertilizer sap from that portion of the base section to which the sap is directed, wherein said tank is contiguous with and communicating with said lowest portion and extending beyond an end wall of the upper section, the tank further including a second top wall covering that portion extending beyond the end wall,
   f. means in said second top wall for permitting access to said collecting tank to remove the fertilizer sap therefrom,
   g. a first access means in the top wall of said upper section for adding decomposable garbage and waste to the housing, and
   h. a second access means in a side wall of said upper section for removing compost from the housing.

7. The compost container of claim 6, with the addition of:
   a. barrier means extending between opposed sides of the upper section to divide the housing into two compartments, and
   b. each of said compartments being provided with said first access means for adding decomposable garbage and waste to the compartment and second access means for removing compost from the compartment.

* * * * *